UNITED STATES PATENT OFFICE.

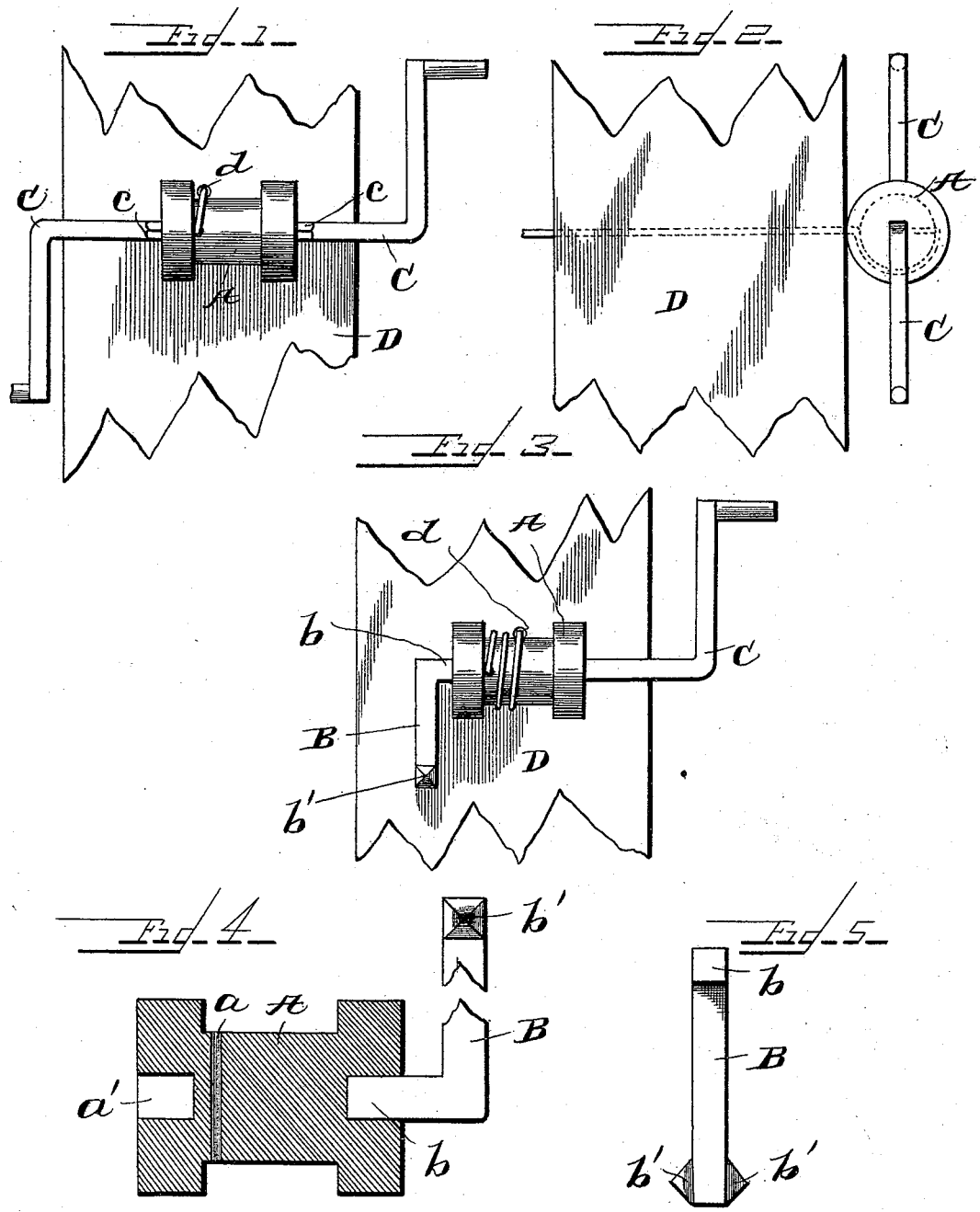

CHARLES H. DICKINSON, OF COLDWATER, MICHIGAN.

WIRE-STRETCHING DEVICE.

SPECIFICATION forming part of Letters Patent No. 488,729, dated December 27, 1892.

Application filed October 13, 1892. Serial No. 448,792. (No model.)

*To all whom it may concern:*

Be it known that I, CHARLES H. DICKINSON, a citizen of the United States, residing at Coldwater, in the county of Branch and State of Michigan, have invented certain new and useful Improvements in Wire-Stretching Devices; and I do hereby declare the following to be a full, clear, and exact description of the invention, such as will enable others skilled in the art to which it appertains to make and use the same.

My invention is an improvement in wire stretching devices and consists in the novel features of construction and combination of parts hereinafter fully described, reference being had to the accompanying drawings which illustrate one form in which I have contemplated embodying my invention.

Referring to the said drawings Figure 1 is a partial elevation of a post, showing my improved stretching devices in the act of stretching the fence wire. Fig. 2 is a side view of the same. Fig. 3 is a view similar to Fig. 1 showing one of the cranks or wrenches removed and the securing dog in place. Figs. 4 and 5 are views showing parts of the devices in detail.

My improved wire stretching and securing devices consist essentially of a spool A and a securing dog B, adapted to be placed in engagement with the spool after the wire has been sufficiently stretched. The spool A is preferably formed of cast iron and is provided with a wire receiving aperture *a*, which extends through it transversely for attaching the wire thereto. The ends of the spool are provided with polygonal shaped recesses $a'\ a'$, which may be formed if preferred by a single aperture extending entirely through the spool longitudinally. The dog B is formed of metal also and has a polygonal arm *b* adapted to engage and fit within one of the recesses $a'$ of the spool, the said arm *b* extending at right angles, substantially, to the main body of the dog. The other end of the dog is provided on two lateral faces with securing points or projections, which will be readily embedded in the post by pressure or by a blow. I also provide a pair of cranks or wrenches C C which have polygonal arms *c c* adapted to engage and fit into the recesses $a'$ of the spool.

The operation of my improved devices is as follows. The post D is provided with a hole *d* through which the wire to be stretched is drawn. The wire is then passed through the aperture *a* of the spool and secured. The wrenches or cranks C C are then placed in engagement with the spool and the spool is turned until the wire is drawn sufficiently tight. One of the said cranks is then removed and the polygonal arm *b* of the dog B is inserted in the recess of the spool so as to bring one of the points $b'$ into such relation with respect to the post, that the tension of the wire will force said point into the wood. The point may however be embedded in the post by a blow from a hammer if desired. The point $b'$ being embedded in the wood either by a blow or by the tension of the wire, will enable the dog to hold the spool against rotation or lateral displacement and the wire will be permanently secured in its stretched condition.

By having the dog B provided with points $b'\ b'$ on each side it will be seen that the dog can be used at either end of the spool and will be operative whether the wire be wound upon said spool one way or the other, hence the dogs B will not need to be made rights and lefts as would be necessary otherwise.

What I claim and desire to secure by Letters Patent is:

1. The combination with the spool provided with wrench receiving recesses, of a dog having a part adapted to engage one of said recesses, extending at an angle to the main body of the dog, substantially as described.

2. The combination with the spool having wrench receiving recesses, of a dog having a securing point at one end and at the other an arm extending at an angle thereto, for engaging one of the said recesses, substantially as described.

3. The combination with the spool having a wrench receiving recess at each end, of a dog provided with securing points on two sides, adjacent to one end, and having an arm extending from the other end at right angles to the main body of the dog, for engaging one of said recesses, substantially as described.

In testimony whereof I affix my signature in presence of two witnesses.

CHARLES H. DICKINSON.

Witnesses:
H. H. BARLOW,
JOSIE GILLESPIE.